(12) United States Patent
Roohparvar

(10) Patent No.: US 9,461,339 B2
(45) Date of Patent: *Oct. 4, 2016

(54) STRUCTURE AND METHOD FOR EXTENDING BATTERY LIFE

(71) Applicant: Batteroo, Inc., San Jose, CA (US)

(72) Inventor: Fariborz Frankie Roohparvar, Monte Sereno, CA (US)

(73) Assignee: Batteroo, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/542,313

(22) Filed: Nov. 14, 2014

(65) Prior Publication Data

US 2015/0072181 A1    Mar. 12, 2015

Related U.S. Application Data

(63) Continuation of application No. 13/236,436, filed on Sep. 19, 2011, now abandoned.

(60) Provisional application No. 61/403,625, filed on Sep. 20, 2010.

(51) Int. Cl.
| | | |
|---|---|---|
| *H01M 10/42* | (2006.01) | |
| *H01M 2/20* | (2006.01) | |
| *H01M 2/30* | (2006.01) | |
| *H01M 6/50* | (2006.01) | |
| *H01M 6/02* | (2006.01) | |

(52) U.S. Cl.
CPC ............. *H01M 10/425* (2013.01); *H01M 2/20* (2013.01); *H01M 2/204* (2013.01); *H01M 2/30* (2013.01); *H01M 6/02* (2013.01); *H01M 6/50* (2013.01); *H01M 10/4257* (2013.01); *H01M 2010/4271* (2013.01)

(58) Field of Classification Search
None
See application file for complete search history.

(56) References Cited

U.S. PATENT DOCUMENTS

| | | | |
|---|---|---|---|
| 4,702,975 A | * | 10/1987 | Fields ................. H01M 2/1055 429/100 |
| 5,229,220 A | | 7/1993 | Stanton et al. |
| 5,489,484 A | | 2/1996 | Wheeler et al. |
| 5,489,485 A | | 2/1996 | Peot et al. |
| 6,118,248 A | * | 9/2000 | Gartstein et al. ............. 320/107 |
| 6,205,034 B1 | * | 3/2001 | Zayatz .......................... 361/824 |
| 6,232,749 B1 | | 5/2001 | Hewes et al. |

(Continued)

FOREIGN PATENT DOCUMENTS

| | | |
|---|---|---|
| CN | 1242109 A | 1/2000 |
| CN | 1303524 A | 7/2001 |

(Continued)

OTHER PUBLICATIONS

PCT/US2011/052209, International Search Report and Written Opinion, Apr. 23, 2012, 8 pages.

(Continued)

*Primary Examiner* — Rena L Dye
(74) *Attorney, Agent, or Firm* — Kilpatrick Townsend & Stockton LLP

(57) ABSTRACT

A battery sleeve for extending the operational life of one or more batteries, the battery sleeve comprising a positive conductive electrode configured such that when the battery sleeve is coupled to at least one battery, the positive conductive electrode of the sleeve serves as the new positive terminal of the at least one battery.

8 Claims, 6 Drawing Sheets

(56) References Cited

U.S. PATENT DOCUMENTS

| | | | |
|---|---|---|---|
| 6,238,818 | B1 | 5/2001 | Dalton |
| 6,654,228 | B1 * | 11/2003 | Bailey .......................... 361/502 |
| 6,835,491 | B2 | 12/2004 | Garstein et al. |
| 6,855,441 | B1 | 2/2005 | Levanon |
| 7,633,261 | B2 | 12/2009 | Baron et al. |
| 7,932,700 | B2 | 4/2011 | Cintra et al. |
| 2001/0043114 | A1 | 11/2001 | Marnfeldt |
| 2002/0142212 | A1 | 10/2002 | Bean et al. |
| 2004/0067740 | A1 | 4/2004 | Handa et al. |
| 2005/0175889 | A1 * | 8/2005 | Han .................. H01M 2/34 429/61 |
| 2005/0191528 | A1 | 9/2005 | Cortes et al. |
| 2008/0136367 | A1 * | 6/2008 | Adest et al. ................... 320/103 |
| 2008/0160392 | A1 * | 7/2008 | Toya ..................... H01M 2/027 429/90 |
| 2008/0238368 | A1 | 10/2008 | Baron et al. |
| 2008/0238369 | A1 * | 10/2008 | Cintra et al. .................. 320/128 |
| 2010/0136374 | A1 * | 6/2010 | Jang .................... H01M 2/0404 429/7 |
| 2012/0121943 | A1 | 5/2012 | Roohparvar |
| 2012/0139501 | A1 | 6/2012 | Cintra et al. |

FOREIGN PATENT DOCUMENTS

| | | | |
|---|---|---|---|
| CN | 1300452 | A | 5/2002 |
| CN | 100376047 | C | 3/2008 |
| CN | 201117696 | Y | 9/2008 |
| EP | 0653798 | A1 | 5/1995 |
| EP | 1191830 | A | 3/2002 |
| JP | 1995-192770 | A | 7/1995 |
| JP | 07-211301 | A | 8/1995 |
| JP | 1996-213057 | A | 8/1996 |
| JP | 2002-510855 | A | 4/2002 |
| JP | 2002-151029 | A | 5/2002 |
| JP | 2002-330548 | A | 11/2002 |
| JP | 2003-047238 | A | 2/2003 |
| JP | 2003-518725 | A | 6/2003 |
| JP | 2003-284250 | A | 10/2003 |
| JP | 3131477 | U | 5/2007 |
| JP | 2007-515149 | A | 6/2007 |
| JP | 2008-235022 | A | 10/2008 |
| JP | 2008-243818 | A | 10/2008 |
| JP | 2010-522963 | A | 7/2010 |
| KR | 100306734 | B1 | 11/2001 |
| WO | WO2005060023 | A2 | 6/2005 |
| WO | WO2008118477 | A1 | 10/2008 |

OTHER PUBLICATIONS

"Ultra Low Power Boost Converter with Battery Management for Energy Harvester Applications," Product information Texas Instrument Incorporated, 25 pages, (Oct. 2011, revised Sep. 2012).

"TPS61291 200mA boost converter with bypass mode," Product information Texas Instruments Incorporated, one page (no date).

Texas Instrument Incorporated, booster convertor product comparison table, one page (no date).

Bodhi Labs product information, http://www.bodhilabs.com/index.html, two pages (no date).

Gomadic Corp. product information, http://www.gomadic.com/battery-backup-cat.html, one page (copyright 2000-2014).

China Intellectual Property Office (SIPO) Office Action for application CN201180049932.X (Dec. 31, 2014).

International Search Report and Written Opinion dated Jan. 29, 2015 for PCT/US2014/63715, 12 pages.

Johns "Fully integrated TPS6300x buck-boost converter extends Li-ion battery life," Texas Instruments Incorporated, Analog Applications Journal, pp. 15-18 (Oct. 21, 2006).

Constantin "AN1337: Optimizing Battery Life in DC Boost Converters Using MCP1640," Microchip Technology Inc. (Aug. 4, 2010), 23 pages.

"Buck-Boost Converters Help Extend Battery Life for Motion Detection," Digi-Key Corporation (Apr. 9, 2013), 4 pages.

Second Japanese Office Action for Japanese Patent Application No. 2013-529396, mailed Mar. 10, 2016, 5 pages.

Final Office Action for Japanese Patent Application No. 2013-529396 mailed Jun. 14, 2016, 5 pages.

Japan Patent Office office actions JPO patent application JP2013-529396 (Aug. 18, 2015).

European Search Report for application EP11827314.3 dated Jul. 6, 2015, 8 pages.

* cited by examiner

STRUCTURE AND METHOD FOR EXTENDING BATTERY LIFE

CROSS-REFERENCE TO RELATED APPLICATIONS

This application is a continuation of U.S. application Ser. No. 13/236,436, filed Sep. 19, 2011, which application claims the benefit of U.S. Provisional Application No. 61/403,625, filed Sep. 20, 2010, which are incorporated herein by reference in their entirety for all purposes.

BACKGROUND

The invention relates in general to battery technology and more particularly to techniques for extending the operational life of batteries such as disposable and rechargeable batteries. Most consumer electronic equipments use batteries. Batteries are classified in terms of primary batteries of dry cells, secondary batteries and rechargeable batteries. Many of electronic equipments are sensitive and need very precise voltages to operate properly. In some cases, if the battery supplying voltage to electronic equipment drops too low, not only does the equipment provide unreliable output, but the low voltage could also damage the equipment. As such, many manufacturers of electronic equipment include circuitry that detects battery voltage levels and if the voltage level drops below a certain level, the circuit would turn itself off. As an example, a fresh unused AA battery provides 1.5V. Over time, as the battery charge is consumed by the equipments that utilize the battery, the battery voltage starts to drop.

Some electronic equipments that use disposable batteries, such as AA batteries, are designed to stop operating when the battery voltage drops by 10% or so. That means when the voltage of an AA battery drops to about 1.4V or 1.35V, the battery is no longer useable by the equipment and has to be replaced with a fresh battery. Thus, the entire voltage range between 0V to 1.35V is wasted, resulting in significant inefficiency. This is akin to the scenario where only 10% of a soda bottle is consumed, as a matter of routine, and the rest discarded. This clearly would be very wasteful and inefficient.

Another factor impacting the cost of batteries is that some of the material used in manufacturing batteries are difficult to mine and in some cases are considered rare earth materials. The price of these materials have been on the rise since some are only found in countries like China, and China has started limiting the export of these materials.

In addition to the adverse economic impacts of battery inefficiencies, there are significant environmental impacts. There are about 3 billion batteries sold every year. Batteries pose a special environmental risk because they contain toxic material that can find their way into our natural resources such as ground water. They also are not biodegradable. Many nations as well as municipalities have laws and local ordinances about recycling of batteries. Furthermore, the carbon footprint associated with manufacturing and distribution of batteries raises concerns. The process of mining these materials, putting them in the batteries, packaging the batteries, and shipping them all over the world takes a lot of energy and generates a lot of greenhouse gases. Thus, improving the use efficiency of batteries provides significant economic as well as environmental benefits.

Thus, there is a need for techniques that improve the efficiency of batteries such as disposable and rechargeable batteries.

BRIEF SUMMARY

Embodiments of the invention provide techniques for significantly increasing the life of batteries. In accordance with one embodiment, a battery sleeve for extending the operational life of one or more batteries, includes a positive conductive electrode and an insulating layer extending below the conductive electrode such that when the sleeve is coupled to a battery, the positive conductive electrode is positioned above the positive terminal of the battery with the insulating layer electrically isolating the positive conductive electrode from the positive terminal of the battery.

In another embodiment, the battery sleeve further includes a negative conductive electrode configured so that when the sleeve is coupled to a battery, the negative conductive electrode is in electrical contact with the negative terminal of the battery.

In another embodiment, the battery sleeve further includes a voltage regulator circuit adapted to receive the positive and negative terminals of a battery and provide an output signal on an output terminal electrically connected to the positive conductive electrode.

In another embodiment, the battery sleeve includes a voltage regulator circuit adapted to receive the positive and negative voltages provided by the battery and generate a substantially constant output voltage on the battery sleeve's positive conductive electrode for the duration of the battery's operating life.

In another embodiment, the voltage regulator is housed in an upper portion of the battery sleeve near the positive conductive electrode. In an alternate embodiment, the voltage regulator is housed in a lower portion of the battery sleeve near the negative conductive electrode.

In another embodiment, when the battery sleeve is coupled to a battery, the positive conductive electrode of the sleeve serves as the new positive terminal of the battery.

In another embodiment, the battery sleeve is configured so that when the sleeve is coupled to a battery, the positive terminal of the battery is covered by the insulating layer such that the positive terminal is not externally electrically accessible.

In yet another embodiment, the battery sleeve is configured so that when the sleeve is coupled to a battery, the negative terminal of the battery is externally electrically accessible.

In accordance with another embodiment of the invention, a battery sleeve for extending the operational life of one or more batteries, includes a positive conductive electrode configured such that when the battery sleeve is coupled to at least one battery, the positive conductive electrode of the sleeve serves as the new positive terminal of the at least one battery.

In one embodiment, the battery sleeve further includes a voltage regulator adapted to receive the voltage provided by the at least one battery and generate a substantially constant output voltage for the duration of the operating life of the at least one battery.

In another embodiment, the battery sleeve further includes an insulating layer extending below the conductive electrode, wherein the sleeve is configured such that when the sleeve is coupled to a battery, the positive conductive electrode is positioned above the positive terminal of the battery with the insulating layer insulating the positive conductive electrode from the positive terminal of the battery.

In another embodiment, the battery sleeve further includes a negative conductive electrode configured so that when the sleeve is coupled to a battery, the negative conductive electrode is in electrical contact with the negative terminal of the battery.

DETAILED DESCRIPTION

In the following description of the present embodiments, reference is made to the accompanying drawings that form a part hereof, and in which is shown by way of illustration specific embodiments in which the embodiments may be practiced. These embodiments are described in sufficient detail to enable those skilled in the art to practice the invention, and it is to be understood that other embodiments may be utilized and that process, electrical or mechanical changes may be made without departing from the scope of the present disclosure. The following detailed description is, therefore, not to be taken in a limiting sense.

Figure 1:
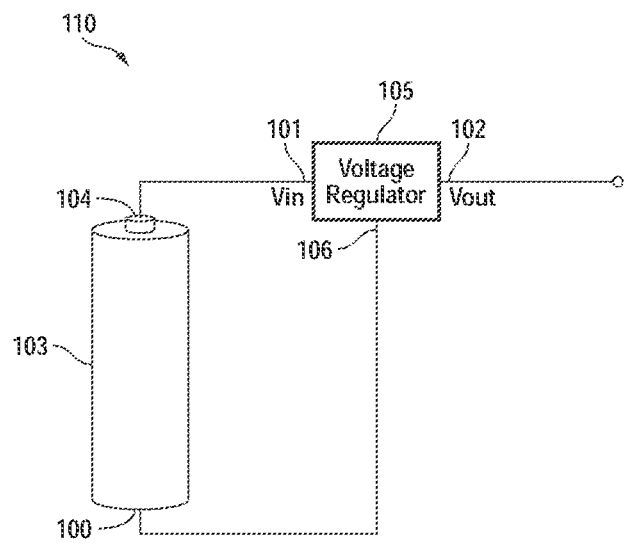
FIG. 1 shows a battery regulation system 110 according to one embodiment.

FIG. 1 shows a battery regulation system 110 according to one embodiment. Positive terminal 104 of battery 103 is connected to input terminal 101 of voltage regulator 105. Ground terminal 100 of battery 103 is connected to ground input terminal 106 of voltage regulator 105. In one embodiment, negative terminal 100 of the battery needs to be routed to where voltage regulator 105 is physically located. This could be accomplished via a flexible PCB that forms part of a battery sleeve which is described in more detail further below. Output terminal 102 of voltage regulator 105 provides the output of battery regulation system 110. There is an insulator placed between positive terminal 104 of battery 103 and output 102 of voltage regulator 105.

The operation of battery regulation system 110 is described next. In one exemplary embodiment of system 110, output 102 of system 110 is regulated to 1.5V. A fresh AA battery provides a voltage to regulator 105 in the range of 1.5V to 1.6V. Output 102 of regulator 105 is then regulated to 1.5V, and thus the output of battery regulation system 110 is fixed to 1.5V. In operation, as the device that uses battery regulation system 110 consumes current from battery 103, the battery gradually loses the charge that was originally placed in the battery thru chemical energy storage means. This causes the voltage output by battery 103 to decline over time. Regulator 105 however keeps providing a constant 1.5V at output terminal 102 even though the input voltage of the regulator is reduced below 1.5V. This in effect provides a constant voltage to the device that uses battery regulation system 110 until the voltage provided by battery 103 is reduced to the minimum voltage regulator 105 can operate with. In this example, that would be around 0.7V to 0.8V. This allows the end device to utilize battery 103 for a longer period of time. Also, a lot more of the stored charge in the battery is used before it is discarded.

Figure 2:
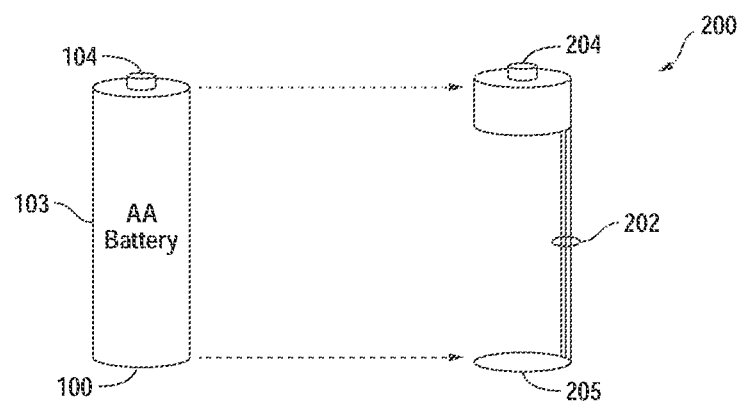
FIG. 2 shows a simplified diagram of a battery sleeve according to one embodiment.

FIG. 2 shows a simplified diagram of battery sleeve 200 according to one invention. Sleeve 200 when coupled to battery 103 covers the battery's top terminal 104. Sleeve 200 has an upper portion that fits snug around the upper portion of battery 103. Sleeve 200 is generally designed to ensure minimal increase in the overall dimension of the battery when coupled to the battery. Sleeve 200 contains an insulator (not shown) which electrically isolates positive terminal 104 of battery 103 from the new positive terminal 204 of battery sleeve 200. Sleeve 200 also includes a bottom section which includes a bottom conductor 205 that electrically connects to negative terminal 100 of battery 103. One or more conductive traces 202 route bottom conductor 205 to the regulator circuit (not shown) housed in the upper part of sleeve 200.

Figure 3:
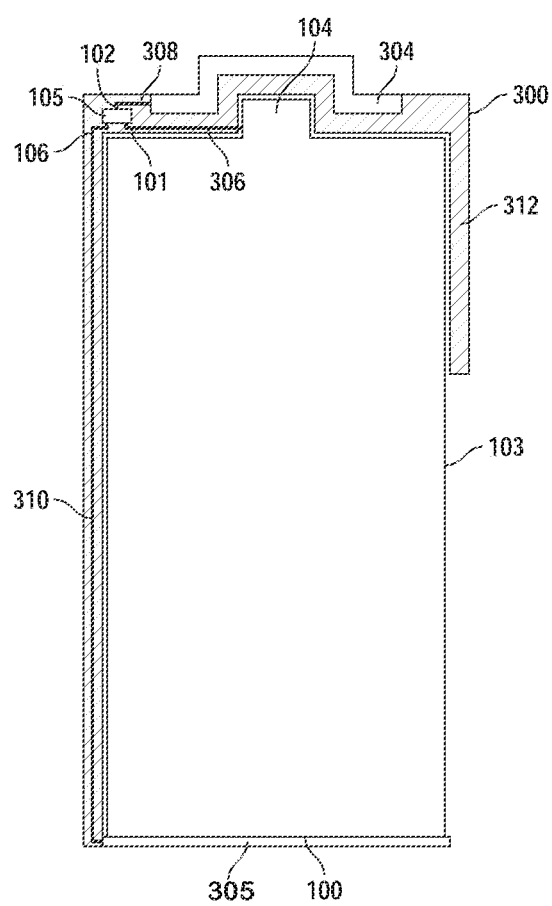
FIG. 3 shows a side view of a battery sleeve coupled to a battery, according to one embodiment.

FIG. 3 shows a side view of sleeve 300 coupled to battery 103, according to one embodiment. Sleeve 300 wraps around the top part of battery 103, and has a top conductor electrode 304 insulated from positive terminal 104 of battery 103 by insulator 312. In this embodiment, regulator 105 is housed in the upper part of sleeve 300. A conductive trace 306 extending in sleeve 300 connects input terminal 101 of regulator 105 to positive terminal 104 of battery 103. Another conductive trace 310 extending in sleeve 300 connects negative terminal 100 of battery 103 to input terminal 106 of regulator 105 through bottom conductor 305. Yet a third conductive trace extending in sleeve 300 connects output terminal 102 of regulator 105 to the sleeve's top conductor electrode 304. Conductive traces 306, 308 and 310 are insulated from one another. As described earlier, in operation, top conductive electrode 304 serves as the battery's "new" positive terminal.

Figure 4:
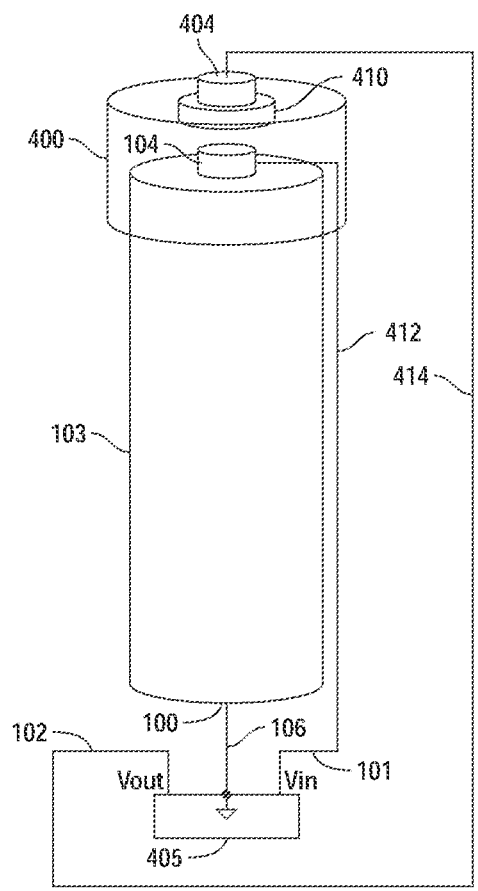
FIG. 4 shows a simplified diagram of a battery sleeve with the regulator circuit placed along a bottom portion of the sleeve according to one embodiment.

In an alternate embodiment shown in FIG. 4, regulator 405 is placed in a bottom portion of sleeve 400 close to where negative terminal 100 of battery 103 would be located when battery 103 is inserted in sleeve 400. In this embodiment, positive terminal 104 of battery 103 is routed by a conductive trace 412 extending through sleeve 400 to the bottom of the sleeve where regulator 405 resides. Conductive trace 412 routed to the bottom is connected to input terminal 101 of regulator 405, and the other input 106 of regulator 405 receives the negative terminal 100 of battery 103 which is present at the bottom of sleeve 400. Output terminal 102 of voltage regulator 405 is then routed up by conductive trace 414 and connected to top conductor electrode 404 of sleeve of 400. As in prior embodiments, the top conductor electrode 404 of the sleeve is insulated form positive terminal 104 of battery 103 by an insulating layer 410. In this embodiment, two conductive trances 412, 414 extend between the upper and lower portions of sleeve 400.

Figure 5:
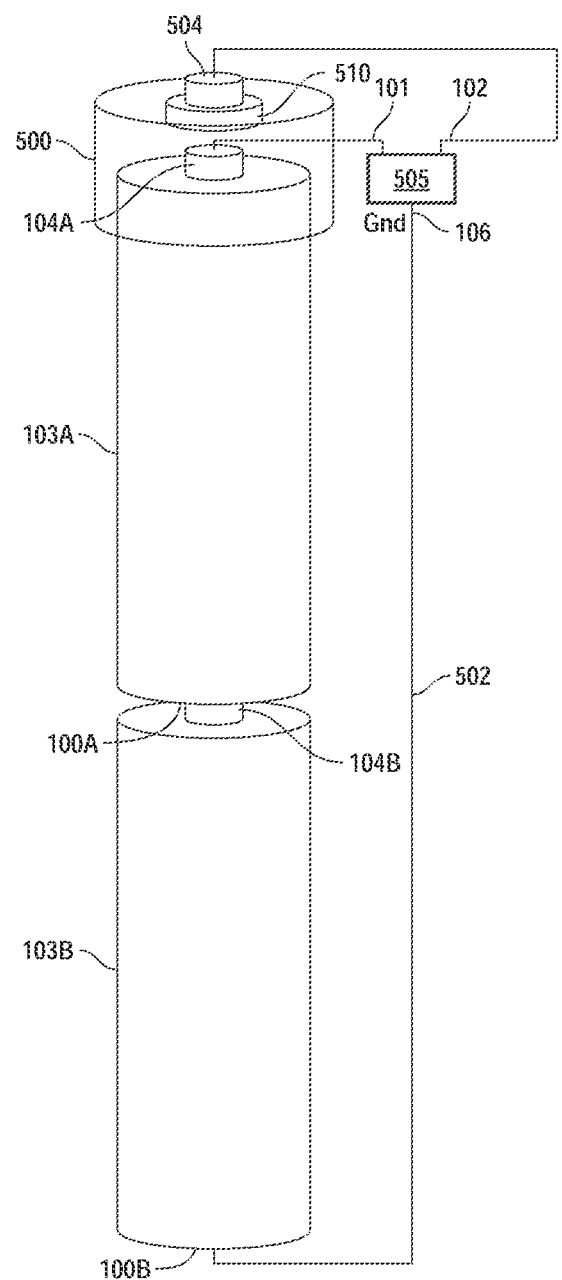
FIG. 5 is a simplified diagram showing an embodiment wherein a battery sleeve is adapted to couple to two serially-connected batteries.

FIG. 5 is a simplified diagram showing an embodiment wherein sleeve 500 is adapted to couple to two serially-connected batteries 103A, 103B. In this exemplary embodiment, batteries 103A, 103B are AA batteries providing a 3V output. Regulator 505 is shown in FIG. 5 outside sleeve 500 to minimize clutter. In practice, regulator 505 is housed in sleeve 500. Regulator 505 is used in a similar manner to the above embodiments. As in previous embodiments, as the voltage of the two batteries drop due to use, regulator 505 provides a constant regulated voltage equivalent to the doubled voltage of fresh batteries.

Figure 6A:
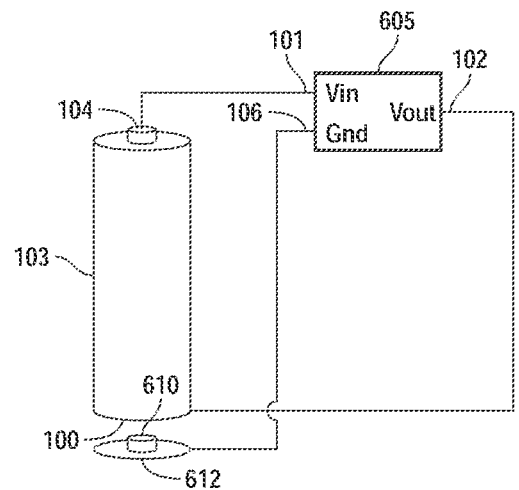
FIGS. 6A and 6B show yet another embodiment wherein the regulator and the sleeve are adapted so that the sleeve provides the positive terminal of the battery to external devices together with a regulated output voltage.
Figure 6B:
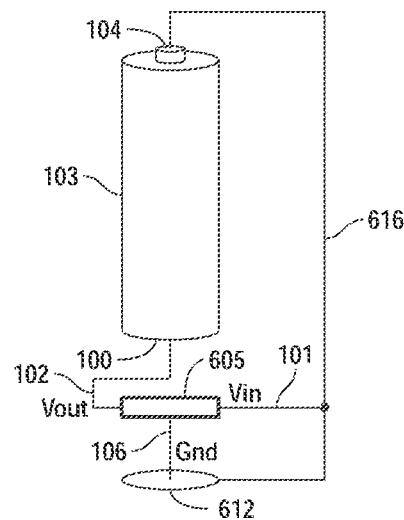

FIGS. 6A and 6B show yet another embodiment wherein the regulator and the sleeve are adapted so that the sleeve provides the positive terminal of the battery to external devices together with a regulated output voltage. FIG. 6A shows how positive terminal 104 and negative terminal 100 of battery 103 are interconnected with the voltage regulator 605. The regulator is shown separate from the sleeve for clarity, though in practice the regulator would be housed in the sleeve. FIG. 6A also depicts insulator 610 which insulates bottom electrode 612 of the sleeve from negative terminal 100 of battery 103. FIG. 6B more accurately reflects the physical location of regulator 605, which is along the bottom of the sleeve. In this embodiment, output 102 of voltage regulator 605 is used as a series voltage to the voltage of the battery. In the beginning when the battery is fresh, output 102 of voltage regulator 605 is set to 0V, or even negative, to make sure the voltage provided by the sleeve to external equipment remains at 1.5V. As the battery charge drops over time, voltage regulator 605 maintains a voltage at its output 102 substantially equal to $1.5V - V_{Battery}$. In other words, the regulator monitors the voltage provided by battery 103 and if it falls below the regulated voltage, it then generates a voltage to compensate for the drop in the battery voltage. As an example, as the battery is used and its voltage drops to 1.1V, voltage regulator 605 provides a voltage of 0.4V at its output 102.

In accordance with embodiments of the invention, a battery sleeve when coupled to a battery, isolates the positive terminal of the battery from external devices, and during operation, regulates the battery voltage to a constant voltage and provides the regulated constant voltage in place of the original battery voltage to external devices. An advantage of such a battery sleeve is that even after the output voltage of the battery drops below the allowable operating voltage of the external equipment, the external equipment continues to receive a constant voltage and thus continues to operate and draw charge from the battery. It would continue doing so until such time that the output voltage of the battery drops below the range that the voltage regulation system can operate. In the AA battery example, without the battery sleeve, the battery needs to be thrown away when it drops from 1.5V to 1.4V or 1.35V. However, with the sleeve, the battery voltage can drop to as low as 0.8V or 0.7V while the external equipment continues to see 1.5V. It is noted that the current level of the battery sleeves need to be in line with the current needs of the end system.

If one looks at the potential return of such a device in terms of lifetime of a battery, one can see significant benefits. For instance, the AA battery in the above example would use roughly the equivalent charge of the battery output in the range of 1.5V to 1.4V. This means that after 0.1V drop, the battery's life is over. If the battery could be used until its voltage reaches 0.8V, then after 0.7V drop the battery's life is over. If one were to assume that the time versus the voltage drop is a linear function, then the life of the battery could be improved by a factor of 7 in this example. However, advantageously the time versus voltage drop is not quite linear. The time it takes for the battery voltage to drop by 0.1V is longer at lower voltages versus at higher voltages. That means that if a constant current was drawn from the battery, it would take the battery a lot longer to discharge from 1.2V to 1.1V than it would from 1.5V to 1.4V. This means that the extent to which the battery life is increased could be even higher than the factor of 7 in the above example above.

It is noted that the regulation circuit has a certain efficiency which cuts back on the extent to which the battery life is extended though the life time reduction is rather minimal. During operation, the regulator itself uses a certain amount of current from the battery. A lot of the available DC to DC converters have high efficiencies of around 95%. That is, of power supplied by the battery, 5% is used by the converter and the rest is available for the end user. However, the 5% efficiency loss due to use of a converter, when compared to the 700% gain in efficiency of the battery, is negligible. It is further noted, that the converter efficiency may drop as the battery voltage drops due to use. For example, as the battery voltage drops from 1.5V to 1V, the efficiency of the converter may drop down to 50% to 60%. However, 50% efficiency is still a significant improvement over the current approach of discarding the batteries because their voltage has dropped below the operable voltage range (i.e., 1.4-1.5V).

The economics of the present invention are attractive. While there may be some cost associate with implementing the present invention, such cost is more than off-set by cost savings achieved in extending the life a battery to equivalent of 5 to 7 batteries. The implementation can be external to the battery as described in various embodiments above or alternatively battery manufacturers could incorporate the regulator circuit and the associated connections inside the battery-housing during the manufacturing process. However, the attachable sleeve implementation has the added advantage that it can be used over and over again. That is, once the battery inside the sleeve is completely used up, the used up battery could be tossed and another battery could be placed inside the sleeve. So, the cost of the sleeve is spread among many batteries thus minimizing the added cost per battery. The attachable sleeve has the added benefit (over the implementation where the regulator is incorporate inside batteries) that the existing battery manufacturing processes, equipments and factories do not need to be changed.

It is noted that the battery compartment of most, if not all, electronic equipment need not be retrofit to accommodate the battery sleeves. While the sleeve slightly increases the height of the battery, the spring in battery compartments used to hold the battery in place can accommodate the added height. The length of the spring is typically in the range of 5 mm to 10 mm. The height increase of the battery due to the sleeve is about 1 mm. The extra height is easily accommodated by the spring compressing one more millimeter when the battery with the sleeve is inserted in the battery compartment. The thickness of the sleeve could of course be reduced as technology advances. For batteries such as 9V batteries where both positive and negative terminals are located along the same end of the battery, the sleeve would have even less of an impact on the size of the battery. That is because for such batteries, the sleeve is simply a male to female converter with an insulator to isolate the battery's positive terminal from the output of the voltage regulator.

In another embodiment, multiple batteries could be placed in series and one sleeve can encompass the series of batteries, such as that shown in FIG. 5. As described with the FIG. 5 embodiment, the output voltage of the serially connected batteries would be used as input to the voltage regulator and the constant output voltage provided by the regulator is provided to external devices. It is noted that the life of such serially connected batteries is increased even more than the case of a single battery, as explained next. A single AA battery, when used without the sleeve, would be tossed when its voltage drops from 1.5V to 1.35V. When used with the sleeve, the battery can be used down to 0.8V. If the battery discharge time was linearly related to the discharge rate of the battery, then the life extension time would be 0.7V/0.15V or more than 4 times. In contrast, in the case where two AA batteries are serially connected and no sleeve is used, the two batteries would need to be tossed when the voltage of the serially connected batteries drops from 3V to 2.7V. When used with a sleeve, the serially connected batteries can be used from 3V down to 0.8V. The life extension time would then be proportional to (3−0.8)/(3−2.7)=2.2/0.3 which results in battery life extension of over 7 times. This assumes a linear relationship between the output voltage and time. However, as explained above, batteries behave non-linearly in that the time it takes to drop by 0.1V from 1.5V to 1.4 v is much shorter than the time it takes to go from 1.3 v to 1.2 v. This advantageously further increases the battery life when a sleeve is used.

In yet another embodiment, the apparatus of the current invention is used in conjunction with rechargeable batteries. There is a phenomenon with rechargeable batteries called shadow effects. If a battery is discharged by a small amount and then fully charged, and if that process is repeated numerous times, the battery loses its ability to hold charge. The current embodiments enable the rechargeable batteries to operate for a much longer time and hence reduce the need to recharge by the end user as frequently.

Another known phenomenon is that if a rechargeable battery is allowed to discharge beyond a certain limit, the number of times that it can be charged is reduced dramatically. The current embodiments include a voltage detection system that detects when the battery reaches the lower limit and shuts off the output voltage, hence increasing the number of times the battery can be charged.

In one embodiment, printed silicon on metal technology can be used to implement the sleeve, the regulator circuitry and its associated connections. There is new technology that uses material other than silicon to process circuitry. These types of printed silicon, which in some cases are printed on stainless steel, could be used to shape the sleeve that goes around the battery. It would also allow for better thermal characteristics.

In yet another embodiment, a flexible PCB could be used to route terminals from one side of the battery to the other side. These flexible, thin layers would allow the sleeve to be very thin.

In yet another embodiment, the efficiency of the regulator system could be adjusted such that while the system would allow for the maximum current output capability of the regulator system to be quite high, the efficiency would be maximum at the output current level that the end system usually runs. For example, if the battery is used in a remote control system, where the average current consumption of the remote control system is 50 mA, then the voltage boosting system, which may be a DC to DC conversion system, is set to be as high as possible at that output current level.

Figure 7:
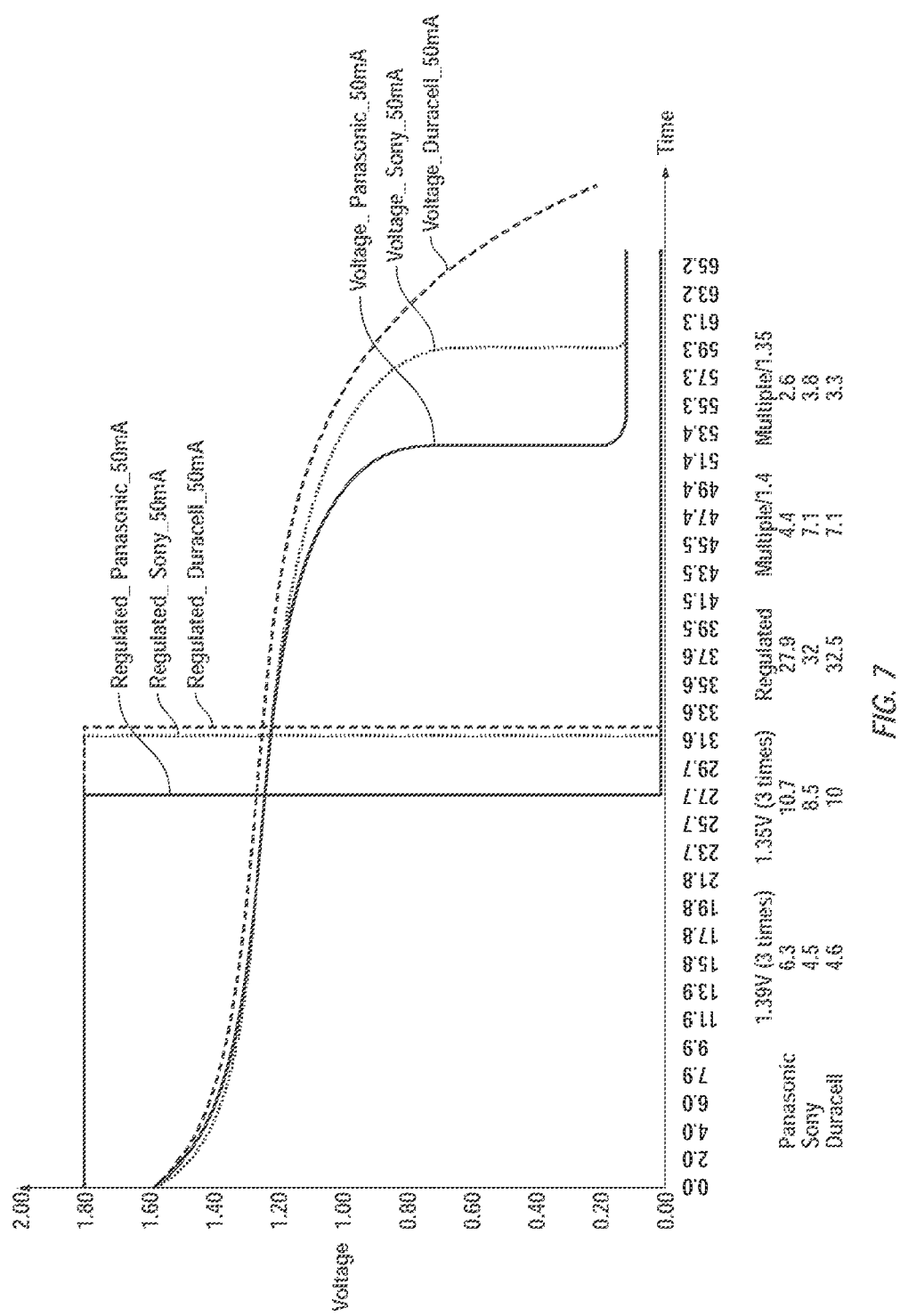
FIG. 7 shows actual measurements that illustrate the advantages of the various embodiments.

FIG. 7 shows measurements that illustrate the advantages of the various embodiments. Three popular AA battery brands, Panasonic, Duracell and Sony were chosen for the measurements. Active load circuitry that drew a fixed 50 mA current was placed at the output of these batteries and the voltage of each battery was measured over time. The horizontal access shows time and the vertical access shows the battery voltage. The starting voltage for these fresh batteries was 1.6V. The amount of time it takes for the batteries to reach 1.39V, which is where a lot of electronic equipment stop operating, are listed. The Panasonic battery took 6.3 hours to reach that level, while it took 4.5 hours for the Sony battery. The Panasonic battery when used in conjunction with a regulator, according to embodiments of the invention, took 27.9 hours before it stopped providing 1.5V, and the Sony battery when used with a regulator took 32 hours before its stopped providing 1.5V. Thus, with the regulator, it takes 4.5 to 7 times longer before the battery needs to be replaced. Thus, the total number of batteries that need to be manufactured and consequently discarded would be reduced by 4 to 7 times. This would have a significant impact on our planet if one takes into account the carbon footprint for extracting all the battery material, their manufacturing, their transportation to stores, their packaging as well as all of the toxic material that end up in our landfills.

Although specific embodiments have been illustrated and described herein, it will be appreciated by those of ordinary skill in the art that any arrangement that is calculated or designed to achieve the same purposes may be substituted for the specific embodiments shown. Many adaptations of the disclosure will be apparent to those of ordinary skill in the art. Accordingly, this application is intended to cover any adaptations or variations of the disclosure.

What is claimed is:

1. A battery sleeve for extending the operational life of a battery, comprising:
   a positive conductive electrode;
   an insulating layer extending below the positive conductive electrode such that when the sleeve is coupled to a battery, the positive conductive electrode is positioned above the positive terminal of the battery with the insulating layer insulating the positive conductive electrode from the positive terminal of the battery;
   a negative conductive electrode configured so that when the battery sleeve is coupled to the battery, the negative conductive electrode is in electrical contact with the negative terminal of the battery;
   a middle portion connecting an upper portion of the battery sleeve to a lower portion of the battery sleeve, the upper portion of the battery sleeve being configured so that when the battery sleeve is coupled to a battery, the upper portion of the battery sleeve partially wraps around the exterior of the battery in order to secure the battery sleeve to the battery; and
   a voltage regulator circuit adapted so that when the battery sleeve is coupled to a battery, the voltage regulator circuit receives voltages provided on the positive and negative terminals of the battery and provides an output signal on an output terminal electrically connected to the positive conductive electrode, the voltage regulator being further adapted so that when a battery is coupled to power a battery-operated electronic equipment through the battery sleeve, the output signal is provided to the battery-operated electronic equipment through the positive conductive electrode,
   wherein the battery sleeve is adapted to be removable and reusable with batteries that plug into the battery compartment of battery-operated electronic equipment, and when the battery sleeve is coupled to a battery, a height of the battery is increased such that the added height of the battery is less than a compressible length of the spring in the battery compartment of battery-operated electronic equipment so that the battery with the battery sleeve coupled thereto fits in the battery compartment of battery-operated electronic equipment.

2. The battery sleeve of claim 1 wherein the voltage regulator is housed in an upper portion of the battery sleeve near the positive conductive electrode.

3. The battery sleeve of claim 1 wherein the voltage regulator is housed in a lower portion of the battery sleeve near the negative conductive electrode.

4. The battery sleeve of claim 1 wherein the battery sleeve is configured so that when the sleeve is coupled to a battery, the negative terminal of the battery is externally electrically accessible, and the positive terminal of the battery is covered by the insulating layer such that the positive terminal is not externally electrically accessible.

5. The battery sleeve of claim 1 wherein the battery sleeve is adapted to be coupled to a disposable battery.

6. The battery sleeve of claim 1 wherein the battery sleeve is adapted to be coupled to a rechargeable battery.

7. The battery sleeve of claim 1 wherein the voltage regulator circuit is adapted to provide a substantially constant output voltage as the output voltage of the battery is reduced.

8. The battery sleeve of claim 1 wherein when the battery sleeve is coupled to a battery, the negative conductive electrode is in physical contact with the negative terminal of the battery.

\* \* \* \* \*